United States Patent [19]
Kariniemi et al.

[11] Patent Number: 5,735,309
[45] Date of Patent: Apr. 7, 1998

[54] LOW PRESSURE GASEOUS FUEL PRESSURE REGULATOR FOR TURBOCHARGED GASEOUS FUEL ENGINES

[75] Inventors: Dean Albert Kariniemi, Plymouth; Thomas Scott Patterson, Ann Arbor, both of Mich.

[73] Assignee: Detroit Diesel Corporation, Detroit, Mich.

[21] Appl. No.: 641,164

[22] Filed: Apr. 29, 1996

[51] Int. Cl.$^6$ .................................................. F16K 31/12
[52] U.S. Cl. ................ 137/505.46; 137/505; 137/484.2
[58] Field of Search ........................... 137/505.46, 505, 137/484.2, 484.4, 505.38

[56] References Cited

U.S. PATENT DOCUMENTS

| | | | |
|---|---|---|---|
| 492,111 | 2/1893 | Schneible | 137/505.46 |
| 792,895 | 6/1905 | Griffiths | 137/505.46 |
| 836,258 | 11/1906 | Hubner | 137/505.46 |
| 1,180,007 | 4/1916 | Cash | 137/505.46 |
| 1,611,263 | 12/1926 | Bihl | 137/505.46 |
| 2,951,494 | 9/1960 | Holmes | 137/505.46 |

*Primary Examiner*—Denise L. Ferensic
*Assistant Examiner*—Ramyar Farid
*Attorney, Agent, or Firm*—Bill C. Panagos

[57] ABSTRACT

A gaseous fuel pressure regulator includes a moveable diaphragm that subdivides the regulator housing into a pressurized gas chamber and a reference pressure control chamber. A coil spring in the control chamber exerts a control force on the diaphragm in opposition to the gaseous fuel pressure that is to be regulated. The diaphragm is connected to a lever that carries a poppet valve element associated with a gaseous fuel inlet port supplying unregulated pressurized gaseous fuel to the gas chamber. An arcuate baffle structure partially surrounds the inlet port, such that gaseous fuel flow is directed from the inlet port toward the gas chamber central axis, instead of flowing directly from the inlet port to a nearby outlet port. Tolerance variations on the manufactured components are overcome by the provision of a spring force adjustment structure, that can comprise a hollow tower carried on the cover of the regulator; and adjustment screw is mounted in the tower to adjust the position of a cup-shaped spring seat. Adjustment of the screw can be used to maintain a desired gaseous fuel output pressure, in spite of tolerance stack-up that might otherwise adversely affect performance of the regulator.

14 Claims, 2 Drawing Sheets

LOW PRESSURE GASEOUS FUEL PRESSURE REGULATOR FOR TURBOCHARGED GASEOUS FUEL ENGINES

BACKGROUND AND SUMMARY OF THE INVENTION

This invention relates to a gas pressure regulator; e.g. a regulator for controlling the pressure of gaseous fuel being supplied to an internal combustion engine.

More particularly, the invention relates to improvements in a gaseous fuel pressure regulator marketed by Impco Inc. of Cerritos, Calif., under its part no. designation PE-7-1. This particular gaseous fuel pressure regulator comprises a multi-piece housing that includes a flexible diaphragm clamped to a housing body by a cover, whereby the interior space within the housing body forms a pressurizable gas chamber, and the interior space within the cover forms a reference pressure control chamber.

Relatively unregulated pressurized gaseous fuel is supplied to the gas chamber through a relatively small inlet port offset from the housing central axis. A poppet-type valve associated with the inlet port is connected to the diaphragm by a lever in the gas chamber, such that movement of the diaphragm along the central axis causes the valve to slightly open or close the inlet port. A coil spring in the reference pressure control chamber exerts a control force on the diaphragm.

The housing body has a relatively large outlet port in near proximity to the inlet port for discharging pressurized gaseous fuel into a gaseous fuel line at a regulated pressure.

In some cases it has been found that the output pressure is not maintained to the desired precision or uniformity. The cause for this non-uniformity is believed to be due at least partly to the fact that some of the gaseous fuel coming from the inlet port travels directly to the nearby outlet port, without contributing to the general pressure prevailing in the gaseous fuel chamber. The gaseous fuel pressure applied to the diaphragm is thus not representative of the gaseous fuel pressure at the gaseous fuel outlet; consequently the diaphragm does not apply the correct operating force to the lever that operates the inlet poppet valve.

Non-uniformity of the gaseous fuel outlet pressure may also be caused partly by the fact that the gaseous fuel which travels from the inlet port to the outlet port does so with slight differences in direction. In some instances, the nominal direction of flow may be directly through the center of the outlet port. These differences in the direction of flow have direct impact on the outlet pressure as more or less flow momentum is dissipated on the wall of the outlet port.

Non-uniformity of the gaseous fuel output pressure may also be caused partly by manufacturing tolerance variations in the various components, e.g. poppet valve dimensions, lever dimensional variations, and spring characteristics. Such tolerance stack-ups can affect the uniformity or consistency of the output pressure, from one pressure regulator to another pressure regulator.

Consistency or uniformity of the output pressure is desirable when the regulator is used for supplying gaseous fuel to an engine, since non-uniformity of the regulated pressure can adversely affect engine performance and emission control.

The present invention is concerned with improvements in the described gaseous fuel pressure regulator designed to correct or overcome the above-noted problems. As regards the problem associated with undesired gaseous fuel flow from the inlet port to the outlet port, the present invention proposes a baffle interposed between the gaseous fuel inlet port and the gaseous fuel outlet port, whereby gaseous fuel flowing through the inlet port is directed away from the outlet port and toward the central axis of the gaseous fuel chamber.

The proposed baffle preferably comprises an arcuate wall partially surrounding the gaseous inlet port, and two divergent side walls extending from the arcuate wall away from the gas outlet port. Gaseous fuel is directed toward the central axis of the pressure chamber, rather than being allowed to travel directly from the inlet port to the outlet port.

As regards the tolerance stack-up problem, the present invention contemplates a screw type adjustment for the coil spring that applies the control force to the diaphragm. The adjustment mechanism preferably comprises a cup element slidably positioned on a cylindrical post within a hollow tower that extends from the housing cover. The coil spring extends into the tower so that one end of the spring abuts a radial flange on the cup element; the other end of the spring abuts the diaphragm.

An adjustment screw extends axially through the post to engage the end wall of the cup element. By threading the screw in the axial direction the cup element can be repositioned to vary the initial spring length and related spring force on the diaphragm.

It is contemplated that each gaseous fuel pressure regulator will be flow tested, while the adjustment screw is being adjusted to achieve a desired output pressure. Once the desired screw setting has been accomplished, a seal will be placed across the screw driver slot on the screw, thereby maintaining the adjustment against tampering or inadvertent change in the screw position.

It is believed that the screw-type adjustment of the diaphragm spring force will overcome tolerance stack-up problems that can occur in the manufacture of gaseous fuel pressure regulators intended to achieve uniform repeatable gas output pressures on a consistent basis.

Further features and advantages of the present invention will be apparent from the attached drawings and descriptions of an illustrative gaseous fuel pressure regulator embodying the invention.

DETAILED DESCRIPTION OF A PREFERRED EMBODIMENT

Figure 1:
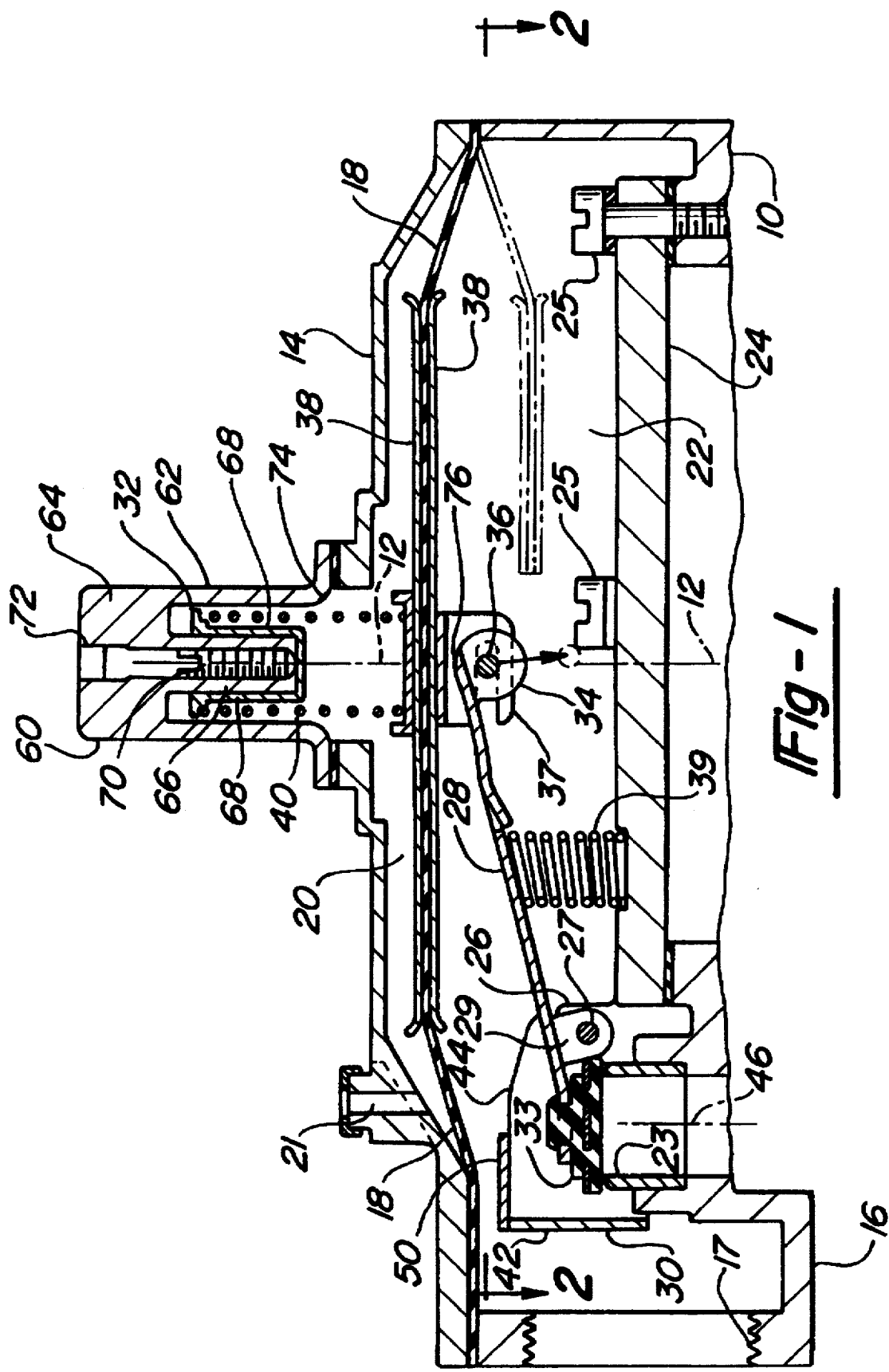
FIG. 1 is a sectional view taken through a gaseous fuel pressure regulator embodying the invention.

Referring to the drawing, there is shown a gaseous fuel pressure regulator similar in many respects to a gaseous fuel pressure regulator marked by Impco Inc. of Cerritos, Calif., under the designation PE-7-1, model E. The regulator is designed for automotive use with liquid propane gaseous fuel (LP gas). The present invention is concerned primarily with a novel baffle means 30 employed in the gaseous fuel pressure regulator between the gaseous fuel inlet port and gaseous fuel outlet port, and a novel spring force adjustment means 32 for controlling the force of a coil spring 34.

As shown in the drawing, the gas pressure regulator comprises a multi-piece housing that includes a cylindrical housing body 10 centered on a central axis 12, and a cover 14 extending across one end of the housing body in a plane normal to central axis 12. Housing body 10 comprises a hollow protuberance 16 that has a threaded opening 17 designed to connect the regulator to a conduit or passage means for the regulated pressure gas output. Opening 17 can be considered the outlet port for the regulator.

A flexible diaphragm 18 is interposed between the upper edge of housing body 10 and the undersurface of cover 14. A series of circumferentially-spaced screws 19 is provided for clamping the cover and diaphragm to housing body 10. Each screw extends through two aligned bosses on the cover edge and housing body side surface. The diaphragm and cover have rectangular extensions designed to mate with the upper edge of protuberance 16.

The interior space above diaphragm 18 forms an reference pressure control chamber 20 that communicates with the a reference pressure via a vent opening 21. The space below diaphragm 18 forms a pressurized gaseous fuel chamber 22 adapted to receive gaseous fuel at a relatively unregulated pressure through inlet port 23. Port 23 is defined by a hollow cylindrical steel insert in the wall of housing body 10.

In this particular gaseous fuel pressure regulator the floor of gaseous fuel chamber 22 is defined, in part, by a die-cast plate 24 secured to the housing body 10 by seven screws 25. As regards the present invention, the gaseous fuel chamber can be formed in various different ways.

Plate 24 has two upstanding lugs 26 that support a stationary pivot pin 27 for a lever 28. Lever 28 comprises two downturned ears 29 having circular openings slidably encircling pin 27, whereby the lever can pivot around the pin 27 axis. The left end of lever 28 carries a poppet valve element 33, formed primarily of a medium durometer rubber material, for sealing engagement with the inlet port 23 when lever 28 is in its FIG. 1 position.

The right end of lever 28 has two downturned ears 34 that have openings press fit on a transverse pin 36. Pin 36 is slidably related to a connector fork channel 37 affixed to the diaphragm backing plates 38 by two rivets, not shown. Pin 36 and fork channel 37 form a connecting means between the lever and diaphragm 18, whereby the lever can move freely around the axis of pivot pin 27 while the diaphragm is movable along central axis 12. The end of lever 28 is chamfered, as at 76, for clearance purposes.

FIG. 1 shows lever 28 in the condition when diaphragm 18 is at the limit of its upstroke. The dashed lines in FIG. 1 shown the diaphragm at the limit of its downstroke. Connector pin 36 moves in an arc around pivot pin 27, while sliding a minor distance on fork 37. A relatively light coil spring 39 is provided between lever 28 and wall 24 to keep pin 36 in contact with the upper edge of the fork (spring 39 prevents play between pin 36 and the fork).

A compression coil spring 40 is provided in control chamber 20 for exerting a control force in combination with the reference pressure on diaphragm 18 in opposition to the gaseous fuel pressure prevailing in chamber 22 and spring force of spring 39. As inlet valve 33 opens to admit additional gaseous fuel into chamber 22 the pressure on the underside of diaphragm 18 is increased; the diaphragm is therefore moved upwardly to return inlet valve 33 toward the closed position. At the same time spring 40 is compressed to increase the spring force on the diaphragm. When combined with the force resulting from the reference pressure, a regulated gaseous fuel pressure is achieved in chamber 22.

It will be noted that outlet port 17 is in near proximity to inlet port 23. There is a tendency for gaseous fuel to flow directly from inlet port 23 to outlet port 17 without producing a corresponding change in the pressure prevailing in chamber 22. As a result, the gaseous fuel pressure at the outlet port 23 may be momentarily different than the pressure on the underside of diaphragm 18. Such momentary pressure differences are undesirable.

Figure 2:
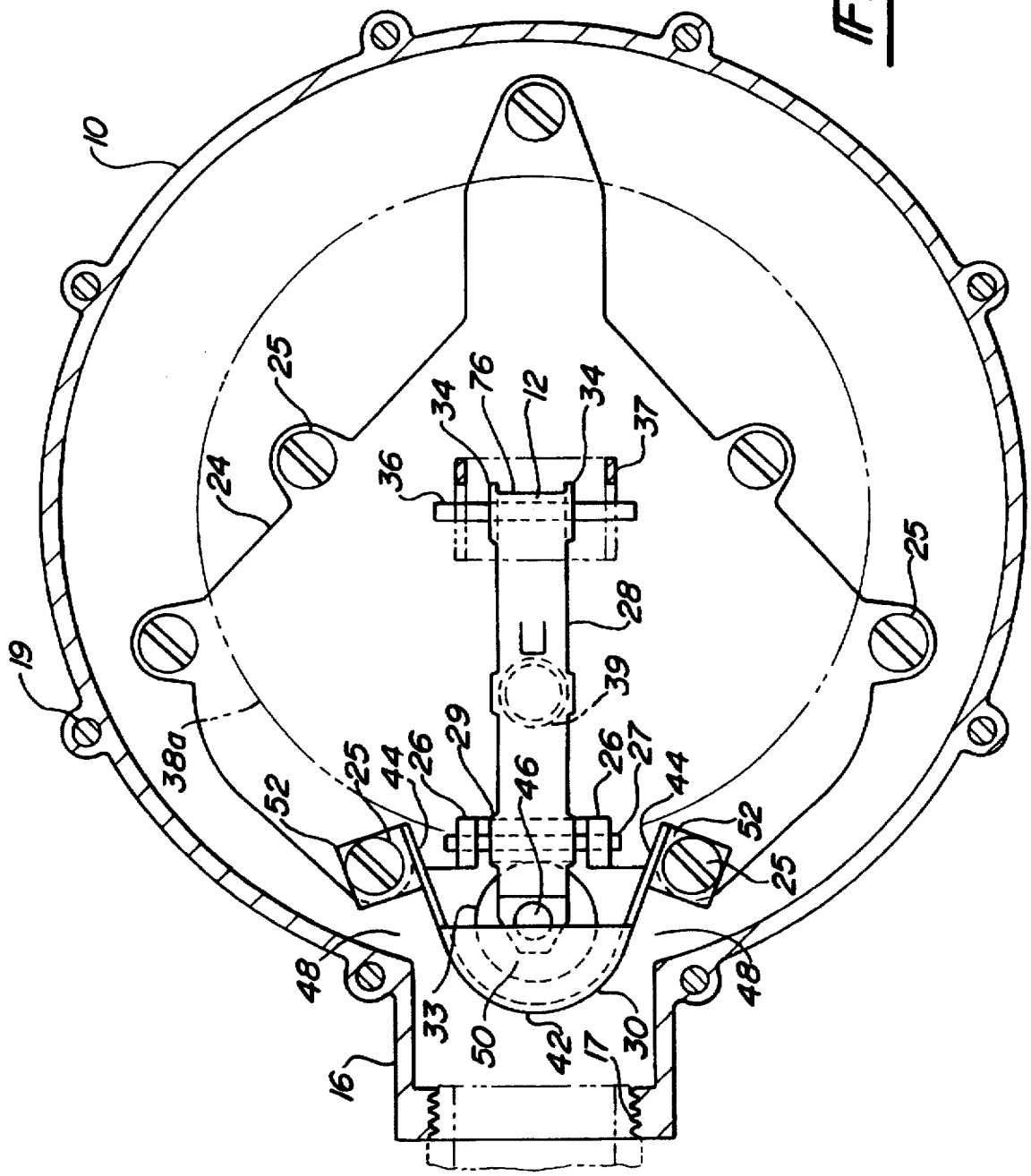
FIG. 2 is a transverse sectional taken essentially on line 2—2 in FIG. 1.

To minimize pressure variations at different locations within chamber 22 the present invention provides a baffle 30 between inlet port 23 and outlet port 17. As shown in FIG. 2, baffle 30 comprises an arcuate upstanding wall 42 partially surrounding port 28, and two essentially linear divergent side walls 44 extending from arcuate wall 42 away from outlet port 17.

Arcuate wall 42 is centered on the axis 46 of inlet port 23 so as to encircle about one half of the port circumference; i.e. arcuate wall 42 has an arcuate length of about one hundred eighty degrees measured around the port axis 46. As shown in FIG. 2, arcuate wall 42 is located directly between ports 23 and 17, i.e. on an imaginary straight line connecting the tow ports. The arcuate wall thus prevents direct gas flow from the inlet port to outlet port 17. Pressurized gaseous fuel leaving port 23 flows along the concave surface of arcuate wall 42 and along the flat inner surfaces of baffle side walls 44 in a fan-like pattern. Gaseous fuel flow is generally away from outlet port 17 and toward the central axis 12 of chamber 22, whereby the gaseous fuel flow contributes to pressurization of chamber 22 instead of direct flow into outlet port 17.

The gaseous fuel pressure in chamber 22 causes gaseous fuel to flow into port 17 via two paths between the outer surfaces of baffle side walls 44 and the housing inner surfaces. In FIG. 2 these paths are indicated generally by numeral 48. The paths 48, being geometrically fixed, cause uniform and consistent flow of gas from chamber 22 and into outlet port 17.

The baffle structure 30 extends upwardly from the plane of inlet port 23 for a considerable distance, in order to prevent gaseous fuel flow around the upper edge of arcuate wall 42. In order to prevent such flow and to prevent direct gaseous fuel flow impingement on diaphragm 18, the baffle includes a segmental roof wall 50 connected to the upper edge of wall 42 so as to overlie inlet port 23. As shown in FIG. 2, segmental wall 50 is dimensioned to overlie approximately one half the inlet port area.

As an option, arcuate wall 42 could be extended upwardly to a point near the lower surface of diaphragm 18. In such case, segmental wall 50 would not be necessary. However, segmental wall 50 is a preferred feature, since it completely eliminates gaseous fuel flow impinging upon the action of the diaphragm by ensuring a uniform pressure balance.

Baffle 30 is constructed as an attachment for installation in a pre-existing pressure regulator. The baffle includes two aperture ears 52 extending right angularly from baffle side walls 44 so as to align with two preexisting screw holes in aforementioned plate 24. Installation of the baffle involves removal of two of the screws 25, and placement of the baffle around the inlet port 23, as shown in FIG. 2. The two screws are then screwed back into place, to hold the baffle in its installed position. The screws extend through suitable circular holes pre-drilled in ears 52.

Baffle 30 is designed to avoid interference with the diaphragm 18. FIG. 2 includes a circular dashed line 38a designating the outer edges of diaphragm backing plates 38. Baffle side walls 44 are dimensioned and angled so that when the diaphragm 18 moves downwardly the side walls 44 will have a non-interfering relation to the edge areas of the lowermost backing plate 38. Baffle side walls 44 may have an included angle of about forty degrees, which is sufficient for clearance purposes and gas flow purposes.

The baffle does not materially interfere with pressurized gas flow to outlet port 17 (via spaces 48); at the same time the baffle prevents direct flow from inlet port 23 to the outlet port, such that chamber 22 is adequately pressurized to produce a desired diaphragm action. Moreover, the baffle ensures a uniform and consistent flow from chamber 22 to outlet port 17.

In preferred practice of the invention, the force of spring 40 is adjustable to compensate for manufacturing variables and tolerance stack-ups. A spring force adjustment means 32 is provided on cover 14.

As shown in FIG. 1, coil spring 40 extends upwardly into a hollow tower 60 mounted on cover 14 so as to be concentric with central axis 12. The tower comprises a tubular cylindrical side wall 62, end wall 64, and internal post 66. The external cylindrical surface of post 66 is machined to slidably support a flanged cup element 68. Coil spring 40 is trained between diaphragm 18 and a radial flange on cup element 68. Cup element 68 constitutes an adjustable seat for the spring.

Element 68 is movable along post 66 by means of a set screw 70 that is threaded into an internally threaded axial hole going through the post and tower end wall 64. Once screw 70 has been turned to a desired axially adjusted position in post 66, a sealing plug 72 is inserted into the central hole in end wall 64, to prevent tampering or inadvertent disturbance to the screw setting.

Tower 60 is constructed so that spring 40 has clearance with respect to the proximate surfaces on side wall 62 and cup element 68. The internal corner 74 of the tower is rounded and chamfered to minimize contact with the spring, should the spring tend to buckle. However, the propensity for the spring to buckle to any appreciable extend is limited by the fact that the spring extends into tower 60 a considerable distance. The side surfaces on cup element 68 and tower side wall 62 are smooth cylindrical surfaces that act as spring guides in the event the spring should tend to buckle. As is well known in the art, the tower should be constructed so as to contain the pressure above the diaphragm, and such an arrangement is contemplated within the scope of this invention.

It is contemplated that each gas pressure regulator will be calibrated prior to being placed in service. With the regulator connected to a gas pressure source, the output flow can be connected to a pressure gage. Screw 70 can be adjusted until a desired output pressure is achieved. The sealing means 72 can then be inserted into the hole in tower end wall 64 to maintain the adjustment.

The illustrated gas pressure regulator is designed to achieve a relatively long diaphragm stroke for a given motion of the inlet valve element 33. Baffle 30 is designed to achieve its function without interfering with the normal diaphragm stroke. In order to maintain the desired diaphragm stroke the connector fork 37 should have a low profile construction, as shown in FIG. 1. The straight edges on the fork should be as close as possible to the associated diaphragm backing plate 38, to prevent any contact between the upper diaphragm backing plate 38 and the cover 14 in the position of FIG. 1. The right end edge of lever 28 is chamfered, as at 76, to enable the lever to have overhead clearance with the fork 37.

Spring force adjustment means 32 is designed to facilitate precision control on the gas output pressure, in spite of normal manufacturing tolerances and tolerance stack-ups associated with normal manufacturing operations;. The invention is directed primarily to the baffle mechanism 30 and the spring force adjustment mechanism 32 that act cooperatively to achieve a desired uniform gas outlet pressure, from one regulator to another regulator.

The drawings are illustrative in nature. Some changes and variations will be apparent to those of ordinary skill in the art, mad can be made while practicing the invention without departing from the scope and spirit of the invention as set forth in the appended claims.

What is claimed is:

1. A gaseous fuel pressure regulator, comprising:

a housing having a central axis running through the middle of the housing, separating the housing into first and second sides, and a transverse axis perpendicular to the central axis; and a gaseous fuel inlet port positioned in said first side parallel to said central axis, and a gaseous fuel outlet port positioned in said first side and parallel to said transverse axis;

a diaphragm subdividing said housing into a pressurized gaseous fuel chamber, and a reference pressure chamber; spring means within said reference pressure chamber exerting a control force on said diaphragm;

a valve element movable toward and away from said inlet port for controlling gaseous fuel flow into said pressurized gaseous fuel chamber; a lever in said gaseous fuel chamber supporting said valve element; means connecting said lever to said diaphragm, whereby movement of said diaphragm along said central axis controls the valve element; and a baffle comprised of an arcuate wall partially surrounding said gaseous fuel inlet port and two divergent sidewalls extending from said arcuate wall away from said gaseous outlet port, said baffle including detachably mounting means comprising a mounting ear extending right angularly from each baffle sidewall; said baffle interposed between said gaseous fuel inlet port and said gaseous fuel outlet port, whereby gaseous fuel flowing through said inlet port is directed away from said outlet port.

2. The gaseous fuel pressure regulator of claim 1, wherein said gaseous fuel inlet port comprises a circular wall centered on a second axis; said baffle comprising an arcuate wall centered around said second axis.

3. The gaseous fuel pressure regulator of claim 2, wherein said baffle comprises a segmental wall extending from said arcuate wall so as to overlie the gaseous fuel inlet port.

4. The gaseous fuel pressure regulator of claim 2, wherein said arcuate wall is located on an imaginary straight line connecting said gaseous fuel inlet port and said gaseous fuel outlet port.

5. The gaseous fuel pressure regulator of claim 2, wherein said baffle comprises two divergent side walls extending from opposite ends of said arcuate wall.

6. The gaseous fuel pressure regulator of claim 5, wherein said divergent said walls are angled at an included angle measuring about forty degrees.

7. The gaseous fuel pressure regulator of claim 1, wherein said housing comprises a cylindrical housing body centered on said central axis, and a cover extending across said housing body in a plane normal to said central axis;

said diaphragm being clamped to said housing body by said cover;

said cover comprising a hollow tower centered on said central axis; an adjustable spring seat located within said tower; said spring means comprising a coil spring trained between said spring seat and said diaphragm; an adjustment screw movable along said central axis within said tower to adjust the position of said spring seat; and means for sealing said screw against tampering of the adjustment.

8. The gaseous fuel pressure regulator of claim 7, wherein said hollow tower comprises a tubular side wall, and an internal cylindrical post spaced radially inwardly from said tubular side wall; said spring seat comprising a flanged cup element slidably positioned on said post.

9. The gaseous fuel pressure regulator of claim 8, wherein said adjustment screw extends axially through said post; said cup element having an end wall abutting said screw, and a radial flange seating one end of the coil spring.

10. The gaseous fuel pressure regulator of claim 9, wherein said tower has an end wall, and an axial opening; said tower end wall permitting access to said tower adjustment screw; said sealing means comprising a plug inserted into said axial opening.

11. Gaseous fuel pressure regulator comprising:

a multi-housing having a central axis running through the middle of the housing, separating the housing into first and second sides, and a transverse axis perpendicular to the central axis; said housing comprising a cylindrical housing body centered on said central axis, and a cover extending across said housing body in a plane normal to said central axis;

a diaphragm clamped to said housing body by said cover for movement along said central axis; said diaphragm subdividing the housing into pressurized gas chamber within the housing and a reference pressure chamber within the cover;

said housing body comprising a gas inlet port positioned in said first side parallel to said central axis, for supply of pressurized gaseous fuel to said pressurized gas chamber, and a gaseous fuel outlet port positioned in said first side and parallel to said transverse axis for delivering gaseous fuel out of said pressurized gas chamber;

a valve element movable toward and away from said inlet port;

a baffle comprised of an arcuate wall partially surrounding said gaseous fuel inlet port and two divergent sidewalls extending from said arcuate wall away from said gaseous outlet port, said baffle including detachably mounting means comprising a mounting ear extending right angularly from each baffle sidewall; said baffle interposed between said gaseous fuel inlet port and said gaseous fuel outlet port, whereby gaseous fuel flowing through said inlet port is directed away from said outlet port;

a lever in said pressurized gas chamber operatively connected to said diaphragm and said valve element, whereby movement of said diaphragm along said central axis controls the valve element;

said cover comprising a hollow tower centered on said central axis; a spring seat located within said tower, a coil spring trained between said spring seat and said diaphragm; an adjustment screw moveable along said central axis to adjust the position of said spring seat; and means for sealing said screw against tampering of the adjustment.

12. The gaseous fuel pressure regulator of claim 11, wherein said hollow tower comprises a tubular sidewall, and an internal cylindrical post spaced radially inwardly from said tubular side wall; said spring seat comprising a flanged cup element slidably positioned on said post.

13. The gaseous fuel pressure regulator of claim 12, wherein said adjustment screw extends axially through said post; said cup element having an end wall abutting said screw, and a radial flange seating one end of the coil spring.

14. The gaseous fuel pressure regulator of claim 13, wherein said tower has an end wall, and an axial opening in said tower end wall permitting access to said adjustment screw; said sealing means comprising a plug inserted into said axial opening.

* * * * *